Patented Nov. 4, 1941

2,261,924

UNITED STATES PATENT OFFICE 2,261,924

TREATMENT OF PACKING HOUSE WASTE

Ernest E. Pittman and Robert Roger Bottoms, Louisville, Ky., assignors to The Girdler Corporation, Louisville, Ky., a corporation of Delaware No Drawing. Application December 20, 1938, Serial No. 246,847

5 Claims. (Cl. 99—5)

This invention relates generally to a process for treating industrial wastes, and more particularly to the treatment of the packing house or slaughter house types of wastes. By the term "packing house" is meant those establishments for the killing, and/or processing of animals, fish, poultry and the like and from which various types of organic refuse results.

Depending upon the efficiency of recovery of the various secondary products derived from the slaughtering and packing processes, the final packing house effluent of waste material will have a greater or less amount of non-recovered solids therein. These solids may be in the form of suspended material and/or soluble material, and will usually be diluted to a greater or less extent with large quantities of wash water, the use of which is necessary in order to maintain the slaughter house and its apparatus in a clean condition.

While it is customary to recover the blood of animals separately and the other various nonedible materials separately for use as tankage, nevertheless, a certain amount of solids, such as dilute blood, serums, albuminous matter, grease or fat particles, hair, flesh, pouch manure, salt and the like, finds its way into the catch basins of the slaughter house and must be disposed of. In some establishments there may be millions of gallons per day of wash waters from the several sections of the packing house which will carry several tons of non-recovered solids into the disposal means, and when this is directed into sewage facilities of a city, an exceptionally high load is thrown on those facilities, particularly, since such solids are highly odorous and putrescible.

It has been estimated that the five-day B. O. D. of an ordinary slaughter house waste will run between 500 and 1500, and that the twenty-day B. O. D. may be as high as 22,500. This demand for oxygen will result in the pollution of any stream into which the waste is directed or else will throw an excessively high load upon normal sewage treating facilities. Health authorities, therefore, have been inclined to impose strict regulations upon the slaughter house waste disposal practices, and prior to our invention, so far as known, no economical way of handling this problem has been devised, particularly, since the usual biological or chlorinating treatments are quite expensive.

A prime object of our invention is to provide an efficient and inexpensive process for treating packing house waste, regardless of the content of organic solids therein, and which serves the dual purpose of recovering a valuable by-product from such waste and simultaneously reducing the B. O. D. of the waste effluent.

In carrying out the invention, waste water containing objectionable impurities from a slaughter house is preferably directed into a central storage means wherein a composite waste liquid resulting from the mixture of different liquids from the several processing divisions of the slaughter house may be averaged for treatment. In this way a plurality of treating processes using variable amounts of our precipitant in proportion to the variable amounts of solids present may be avoided. However, it is to be understood that if desired any desired fractional part of the waste from a packing house can be treated and the remainder can be run to disposal without treatment.

From the composite waste storage tank the material may be pumped into any convenient mixing apparatus into which a slurry of a bentonite in colloidal suspension may be added, after which the mixture is thoroughly agitated and heated when desired. The thus treated mixture of waste liquid and colloidal bentonite slurry may then be directed into any suitable separating means, such as a settling basin, vacuum or other types of filter apparatus, or any desired type of centrifugal apparatus. In this apparatus a filter cake or precipitate of an agglomerate of bentonite and organic solids from the waste will be recovered and a liquid effluent will be discharged.

It is found that the average composite waste to be treated will be approximately neutral in pH, and that no adjustment of its pH is necessary in our process. In contrast with previous practices wherein alkaline or acidic materials are used in the treatment, the present process produces an effluent which has the same pH as the raw material.

Since bentonite has neither an acid nor an alkaline character, and since it apparently exerts only a physical action upon the material under treatment, and appears to be devoid of chemical activity therewith, the byproducts recovered are found to be of superior quality for feed purposes.

Likewise, the waste effluent which has substantially all of the soluble material removed therefrom, and which is substantially as pure as the usual wash water, may be recirculated for use in washing of the plant apparatus. This feature, therefore, has practical advantage for those packing houses wherein a large supply of water is needed for washing purposes, since the needs of such a plant can be substantially reduced through the use of the clarified effluent as a wash water.

As is well known, when albuminuous material such as blood, fat and similar material of animal origin is present in a waste of this character, the raw waste is substantially non-filterable. However, when such waste is heated to boiling, the albuminous material coagulates and the waste then filters readily. In such a case, however, the effluent still contins the soluble proteinaceous matter which causes the high B. O. D. and which forms a nuisance in the disposal source. Such soluble proteinaceous matter would be highly desirable as a feed ingredient or as a fertilizer if it were possible to recover the same, and in accordance with our invention this desirable result may now be obtained.

We have found that when bentonite which will form a colloidal suspension, and which is neither acid nor alkaline in character, is mixed with the raw waste, or with a waste effluent which has been previously boiled and filtered, we are able to recover substantially all of the soluble protein therein. Bentonite acts not only to form an agglomerate with the soluble protein as well as suspended proteins, but also acts to a certain extent as a filter aid in removing soluble proteinaceous matter.

From tests made with bentonite upon a representative type of packing house waste, it has been found that the five-day B. O. D. of the non-treated waste was 1100, and upon being subject to the bentonite treatment the effluent therefrom had a five-day B. O. D. of 90, which was well within the requirements of the health authorities.

While the above process may be practiced with many widely varying ratios of colloidal bentonite slurry to packing house wastes and with many widely varying conditions of temperature, pH, types of slurry and other variations, the process will work most efficiently when the mixture of waste and slurry is treated at a temperature somewhat above the normal temperature of the waste liquid. In many modern packing houses employing refrigeration and air conditioning, the waste wash liquid is held at a low temperature, and if treated at these temperatures a longer period of time is needed for the efficient agglomeration of bentonite and waste.

We have found that the mixing of a colloidal bentonite slurry having a ratio of one part dry bentonite to fifteen parts water by weight, when mixed in the ratio of about one and one-half to three parts slurry to one hundred parts waste liquid at atmospheric temperature, will filter successfully over a period of time, although the untreated packing house waste liquid will not filter successfully even over great periods of time. This phenomenon is thought to be due to the fact that the colloidally suspended protein particles of the untreated waste material will form a film upon any efficient filtering surface, such as a filtering cloth, and will pass through any large filtering surface, such as a screen, whereas on the other hand, when mixed with colloidal bentonite, a coagulation of the bentonite and protein particles forms a filterable agglomerate which has enough body to rest upon the filtering surface and permit a clarified liquid to pass through that surface. The same filtering result for removing suspended protein may be secured with the use of a material acting as a filter aid, but in such a case the soluble protein still passes into the waste channels.

As the mixture of colloidal bentonite slurry and waste material is heated, the rate of filtration is markedly increased, and when the mixture is heated to approximately its boiling point, an immediate flocculation of protein and bentonite is noted when the bentonite is added to the hot waste material.

Since the solids contain valuable mineral and nitrogenous constituents, the recovered agglomerate may be directed into the tankage vat and be utilized as tankage, or else may be recovered and treated separately to form an improved feed, fertilizer, or ingredient of the same. In general, we have found that in order to insure a maximum recovery of the waste solids and at the same time insure a maximum diminution of the disposal problem, it is advisable to add approximately an equivalent amount of bentonite by weight to the weight of solids calculated in the waste under treatment and for effective recovery of the soluble protein content, the protein and colloidal bentonite should not be greater than twice or less than one-half the weight of each other. As a consequence, the recovered filter cake will contain approximately fifty per cent. organic solids, and will command a high market price for use as a feed, an ingredient of feed, or as a fertilizer.

In carrying out our process, a minimum of mechanical equipment is necessary, and when it is desired to heat a relatively cold waste liquid in order to enhance the coagulation of its solids, we propose to employ an efficient heat exchange apparatus so that the treated material after having reached its maximum temperature, may aid in preheating the incoming material prior to said treated material being introduced into the separating apparatus.

In following these teachings of our invention it is possible for the operator of a packing house to recover sufficient valuable by-products from his otherwise useless waste to pay all or part of the costs of operating the process, and at the same time such operator is enabled to substantially eliminate the entire problem of waste disposal which heretofore has been a serious problem for the health and welfare of the community in which a packing house is located.

Having thus described our invention, what we claim as new and desire to secure by Letters Patent is:

1. The process of treating packing house waste liquid containing proteinaceous material, which includes mixing with said liquid bentonite capable of dispersion in water and forming a relatively stable suspension therein, whereby there is formed a readily filterable precipitate of agglomerated bentonite and proteinaceous material, and then removing said precipitate from the liquid.

2. The process of treating packing house waste liquid, including coagulating dissolved and suspended proteins in said liquid by the action of colloidal bentonite, the colloidal bentonite being present in an amount equal to one-half to two times the amount of the dissolved protein, and removing the coagulated material and other solids from the liquid.

3. The process of treating packing house waste liquid, including coagulating dissolved and suspended proteins in said liquid by the action of colloidal bentonite at an elevated temperature, the colloidal bentonite and the soluble proteins being present in the ratio of about one to one, and thereafter removing the coagulated material and other solids from the liquid.

4. The process of purifying the liquid content of packing house waste liquid and utilizing the same for washing purposes, including subjecting the liquid waste to the action of colloidal bentonite at a temperature of about 100° C. and forming a precipitate of an agglomerate of said bentonite and the dissolved and suspended proteins and other solids in said liquid therefrom, separating the coagulated material and other solids, and utilizing the residual purified liquid for wash purposes.

5. The process of treating a packing house waste material in aqueous form, including subjecting the material to the action of colloidal bentonite at a temperature of about 100° C. and rapidly forming an agglomerate of said bentonite and dissolved and suspended solids of said packing house waste, and thereafter removing the agglomerate of bentonite and other solids, and directing the residual liquid to a point of disposal.

ERNEST E. PITTMAN.
ROBERT ROGER BOTTOMS.